Sept. 15, 1942.　　　　O. L. WEBER　　　　2,295,765

FLY ROD LURE

Filed Sept. 29, 1941

Inventor
O. L. Weber
By H. B. Wilson & Co.
Attorneys

Patented Sept. 15, 1942

2,295,765

UNITED STATES PATENT OFFICE 2,295,765

FLY ROD LURE

Oscar L. Weber, Stevens Point, Wis.

Application September 29, 1941, Serial No. 412,850

5 Claims. (Cl. 43—48)

The invention aims to provide a simple, inexpensive and effective fly rod lure so constructed as to produce a "pop" when the fishing line is given a quick jerk, and so constructed also as to have both a vertical and a horizontal wiggle or snake or wormlike movement.

With the foregoing in view, the invention resides in the novel subject matter hereinafter described and claimed, description being accomplished by reference to the accompanying drawing.

Figure 1:
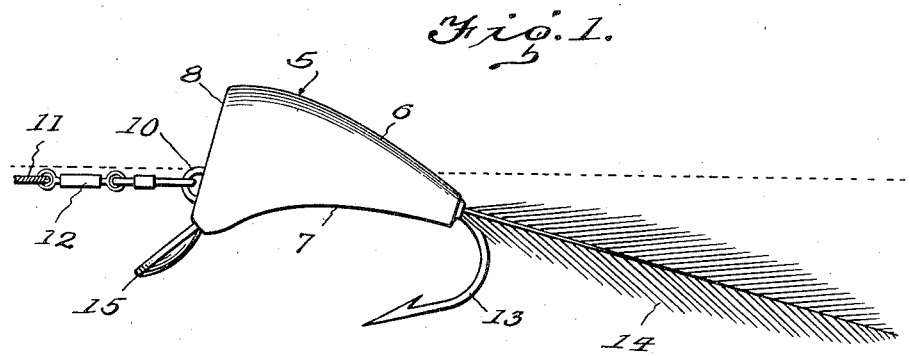
Figure 1 is a side elevation showing the normal position of the lure upon the water (dotted lines).
Figure 2:
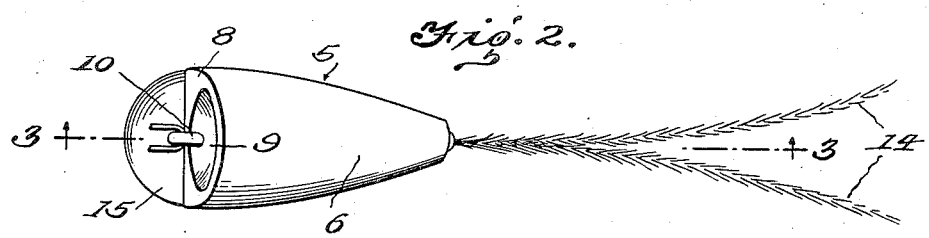
Figure 2 is a top plan view.
Figure 3:
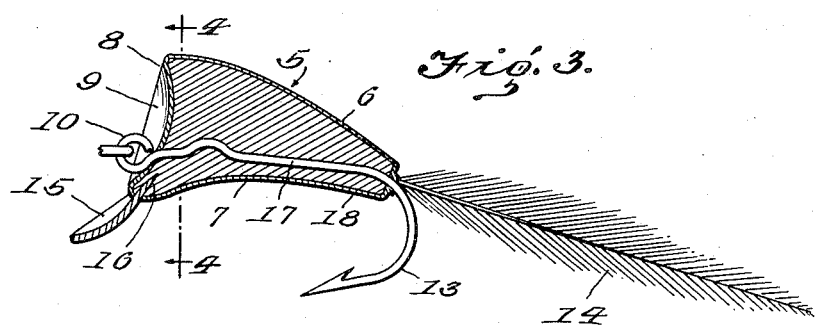
Figure 3 is a central vertical longitudinal sectional view on line 3—3 of Fig. 2.
Figure 4:
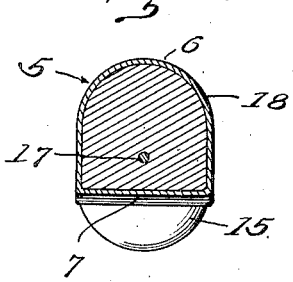
Figure 4 is a vertical transverse sectional view on line 4—4 of Fig. 3.

A preferred construction has been illustrated and will be specifically described, with the understanding, however, that variations may be made within the scope of the invention as claimed.

A stubby buoyant body 5 is provided, said body being rearwardly tapered. The upper side 6 of this body is convex both longitudinally and transversely, and the lower side 7 of said body is longitudinally concave and transversely straight. The front extremity 8 of the body 5 is disposed in a transverse plane which steeply inclines rearwardly, and said front extremity is provided with a shallow concave recess 9. Within the lower portion of this recess is an eye 10 for connecting a line with the lure. A fragment of the line is shown at 11 in Fig. 1 and it is connected with the eye or the like 10 by a suitable connection including a swivel 12. The rear extremity of the body 5 is provided with a hook 13 which extends rearwardly, downwardly and forwardly therefrom, said rear extremity being also provided with a suitable flexible tail which preferably consists of two rearwardly diverging feathers 14, the quills of which are simply anchored in openings (not shown) in the rear end of said body.

The front lower corner of the body 5 is provided with a lip 15 which declines forwardly therefrom, said lip being preferably of concavo-convex form. The upper end of this lip is preferably skived to a feather edge and suitably cemented in a transverse kerf 16 in the body.

The body 5 may be formed from any light buoyant material, cork for example, and could be of hollow form if desired. The shank 17 of the hook 13 preferably extends longitudinally through this body and is provided with the eye 10. The lip 15 is preferably formed from a substantially semi-circular piece of sheet Celluloid or similar plastic of transparent nature in most instances. The body 5 may of course be decorated in any desired way and all outer surfaces of this body are sealed against entrance of water by means of an appropriate waterproof coating 18.

When cast, the lure always alights on the surface of the water, hook down, as illustrated in Fig. 1, and it will float substantially in this position as long as still. Quick forward tension or jerk upon the line, due to the lip 15, causes the entire lure to "nose over," causing its front extremity 8 to strike upon the surface of the water, with the result that, even on rough water, a "pop" is produced due to the concave recess 9. By a proper pull upon the line, the lip 15 will also cause the lure to dive, and whenever said lure is being retrieved, its shape causes it to have both a vertical and a horizontal wiggle, similar to a snake or worm. The lure is thus very effective for all kinds of fishing ordinarily requiring flies.

While a preferred construction has been illustrated and specifically described, attention is again invited to the possibility of making variations within the scope of the invention as claimed.

I claim:

1. A fly rod lure comprising a stubby buoyant body having a hook and a tail at its rear end and a line connection at its front end, the front extremity of said body being disposed in an almost vertical rearwardly inclined plane and having a shallow recess concave both vertically and horizontally and a rigid rearwardly inclined lip secured to said front extremity of said body under said recess, said line connection being above said lip to cause said body to "nose over" when the line is jerked, thereby causing the recessed front extremity of the body to strike upon the surface of the water and produce a "pop."

2. A fly rod lure comprising a stubby buoyant body longitudinally tapered from its front end to its rear end, the upper side of said body being both longitudinally and transversely convex, the lower side of said body being longitudinally concave and transversely straight, the front extremity of said body being disposed in an almost vertical rearwardly inclined plane, said front end of said body being provided with a shallow concave recess and with a line connection within said recess, said recess being concave both vertically and horizontally, a hook projecting rearwardly, downwardly and forwardly from the rear extremity of said body, a flexible tail projecting rearwardly from said body and hook, and a thin forwardly declined lip secured to the lower front corner of said body to cause the latter to "nose over" when the line is jerked, causing the recessed front extremity of said body to strike upon the surface of the water and produce a "pop," the shape of said body causing it to have both a vertical and a horizontal wiggle when retrieved.

3. A structure as specified in claim 2; said lip being concavo-convex with its concave side disposed forwardly.

4. A structure as specified in claim 2; said body having a transverse inclined kerf in which the upper end of said lip is secured.

5. A fly rod lure comprising a buoyant body in substantially the form of a stubby cone and having its larger end disposed forwardly, said body having substantially vertical sides, an upper side which is both longitudinally and transversely convex, a lower side which is longitudinally concave and transversely straight, and a front extremity which is disposed in an almost vertical plane steeply inclined rearwardly; said front extremity of said body joining said lower side of said body on a line extending straight across said body, said front extremity of said body having a shallow recess concave both vertically and horizontally and being provided with a line connection within said recess, a hook secured to the rear end of said body and having its free end directed forwardly under said body, a feather-like tail secured to and extending rearwardly from said body, and a thin concavo-convex lip at the front end of said body and inclined rearwardly less steeply than said front extremity of said body, the upper end of said lip being rigidly secured to said body along the aforesaid straight line and extending throughout the width of said body.

OSCAR L. WEBER.